United States Patent
Eriksson et al.

(10) Patent No.: US 11,719,172 B2
(45) Date of Patent: Aug. 8, 2023

(54) CONTROL UNIT AND METHOD THEREIN FOR CONTROLLING EXHAUST VALVES OF CYLINDERS IN AN INTERNAL COMBUSTION ENGINE

(71) Applicant: VOLVO TRUCK CORPORATION, Gothenburg (SE)

(72) Inventors: Anders Eriksson, Torslanda (SE); Jan Odeberg, Bohus-Björkö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/343,478

(22) Filed: Jun. 9, 2021

(65) Prior Publication Data

US 2021/0388776 A1 Dec. 16, 2021

(30) Foreign Application Priority Data

Jun. 12, 2020 (EP) .................................. 20179779

(51) Int. Cl.
| | | |
|---|---|---|
| *F02D 13/02* | (2006.01) | |
| *F02D 23/00* | (2006.01) | |
| *F02D 41/00* | (2006.01) | |
| *F02D 41/26* | (2006.01) | |

(52) U.S. Cl.
CPC ......... *F02D 13/0249* (2013.01); *F02D 23/00* (2013.01); *F02D 41/0082* (2013.01); *F02D 41/26* (2013.01)

(58) Field of Classification Search
CPC ............. F02D 13/0257; F02D 13/0249; F02D 41/0082; F02D 41/0047; F02M 26/14; F02M 26/41
See application file for complete search history.

(56) References Cited

U.S. PATENT DOCUMENTS 6,230,696 B1   5/2001  Veit et al.
9,845,737 B2   12/2017 Choi
(Continued)

FOREIGN PATENT DOCUMENTS

DE   102013003067 A1   8/2014
EP      2397681 A2    12/2011
(Continued)

OTHER PUBLICATIONS

European Search Report dated Nov. 12, 2020 in corresponding European Patent Application No. 20179779.2, 12 pages.

*Primary Examiner* — Logan M Kraft
*Assistant Examiner* — Anthony L Bacon
(74) *Attorney, Agent, or Firm* — Venable LLP; Jeffri A. Kaminski

(57) ABSTRACT

A method performed by a control unit (11) for controlling exhaust valves (1A-6A, 1B-6B) of cylinders (1-6) in an internal combustion engine (10) is provided. The method comprise controlling (410) a number of first exhaust valves (1A-3A) for a first set of cylinders (1-3) to transfer exhaust gas to a turbine (8)) during part of an exhaust phase ($\Delta t_1$) of the first set of cylinders (1-3) via a first exhaust manifold (12). Also, the method comprises controlling (420) a number of second exhaust valves (1B-3B) for the first set of cylinders (1-3) to transfer exhaust gas to an exhaust gas recirculation, EGR, conduit (9)) during part of the exhaust phase ($\Delta t_1$) of the first set of cylinders (1-3) via a second exhaust manifold (7). The method further comprises controlling (430) a number of first exhaust valves (4A-6A) for a second set of cylinders (4-6) to transfer exhaust gas to the turbine (8) during part of an exhaust phase ($\Delta t_2$) of the second set of cylinders (4-6) via the first exhaust manifold (12). Furthermore, the method comprises controlling (440) a number of second exhaust valves (4B-6B) for the second set of cylinders (4-6) to transfer exhaust gas to the EGR conduit (9)

(Continued)

during a part of the exhaust phase ($\Delta t_2$) of the second set of cylinders (4-6) via the second exhaust manifold (7). Here, the exhaust phase ($\Delta t_1$) of the first set of cylinders (1-3) is separated in time from the exhaust phase ($\Delta t_2$) of the second set of cylinders (4-6).

A control unit (11), a computer program, a carrier, an internal combustion engine and a vehicle is also provided.

16 Claims, 5 Drawing Sheets

(56) References Cited

U.S. PATENT DOCUMENTS

2008/0110161 A1\* 5/2008 Persson .................. F02M 26/05
60/299
2013/0174816 A1 7/2013 Riley et al.
2015/0316005 A1\* 11/2015 Madison ............. F02D 13/0261
60/602
2015/0354471 A1\* 12/2015 Kopecek ............. F02D 41/0087
123/406.2
2018/0355824 A1\* 12/2018 Springer ................ F02M 26/22
2019/0063351 A1 2/2019 Zeng et al.
2020/0208561 A1\* 7/2020 McConville ........ F01N 13/1805
2020/0284217 A1\* 9/2020 Hakeem ............. F02D 13/0257

FOREIGN PATENT DOCUMENTS

| WO | 9950259 | A2 | 10/1999 |
| WO | 9960259 | A1 | 11/1999 |
| WO | 2010149563 | A1 | 12/2010 |
| WO | 2014137266 | A1 | 9/2014 |

\* cited by examiner

CONTROL UNIT AND METHOD THEREIN FOR CONTROLLING EXHAUST VALVES OF CYLINDERS IN AN INTERNAL COMBUSTION ENGINE

TECHNICAL FIELD

Embodiments herein relate in general to turbochargers and exhaust gas recirculation, EGR. In particular, embodiments herein relate to a control unit and a method therein for controlling exhaust valves of cylinders in an internal combustion engine. Also, the embodiments herein relate to a computer program and a carrier, as well as, an internal combustion engine and a vehicle.

BACKGROUND

In internal combustion engines, exhaust gas recirculation, EGR, is a nitrogen oxide emissions reduction technique used in petrol/gasoline and diesel engines. EGR works by recirculating a portion of an engine's exhaust gas back to the engine cylinders. This dilutes the oxygen in the incoming air stream and provides gases inert to combustion to act as absorbents of combustion heat to reduce cylinder peak temperatures. This results in reduced emission of nitrogen oxide. However, depending on the arrangement of the turbocharger in the internal combustion engine, recirculating a suitable EGR portion of exhaust gas back to the engines cylinders is provided with some challenges.

In some cases, for example, when having a turbocharger with a Variable Geometry Turbine, VGT, arranged in connection with the exhaust manifold of the engine's cylinders, it may be possible to recirculate a suitable EGR portion of the exhaust gas by controlling the pressure of the exhaust gas in the inlet manifold of the engine's cylinders, i.e. by adjusting the geometry of the VGT. A drawback with having a turbocharger with a VGT arranged to perform EGR in this way is that that the gas exchange of the engine will be reduced due to that the engines cylinders will have to work against a higher pressure on the outlet side than on the inlet side. This will also increase the amount of work needed to be performed, and thus also increase the fuel consumption of the engine.

This problem may generally not exist for cases when having a turbocharger with a Fixed Geometry Turbine, FGT, arranged in connection with the exhaust manifold of the engine's cylinders. This is because in this case the pressure on the outlet side is the same as on the inlet side. However, since there is no pressure difference available to drive the recirculation of exhaust gas back to the engine cylinders, the EGR recirculation must be driven by the exhaust pulses that are generated when the exhaust valves of the cylinders are opened. However, to recirculate a suitable EGR portion of exhaust gas back to the engines cylinders in this manner may be complicated.

One example of EGR recirculation when having a turbocharger with a FGT is described in WO 2014/137266. Here, an arrangement is described in which the exhaust valves in at least one cylinder is opened earlier than in at least one other cylinder in order to have the forceful early part of an exhaust pulse to drive the EGR recirculation. Besides resulting in that the engine's power will not be maintained and an increased fuel consumption, this will also reduce the pulse energy available to be used by the FGT since the forceful early part of at least one exhaust pulse in at least one cylinders instead will be used for the EGR recirculation.

SUMMARY

It is an object of embodiments herein to improve the use of the pulse energy of exhaust gas from cylinders in an internal combustion engine.

According to a first aspect of embodiments herein, the object is achieved by a method performed by a control unit for controlling exhaust valves of cylinders in an internal combustion engine. The method comprises controlling a number of first exhaust valves for a first set of cylinders to transfer exhaust gas to a turbine during part of an exhaust phase of the first set of cylinders via a first exhaust manifold. Also, the method comprises controlling a number of second exhaust valves for the first set of cylinders to transfer exhaust gas to an exhaust gas recirculation, EGR, conduit during part of the exhaust phase of the first set of cylinders via a second exhaust manifold. The method further comprises controlling a number of first exhaust valves for a second set of cylinders to transfer exhaust gas to the turbine during part of an exhaust phase of the second set of cylinders via the first exhaust manifold. Furthermore, the method comprises controlling a number of second exhaust valves for the second set of cylinders to transfer exhaust gas to the EGR conduit during part of the exhaust phase of the second set of cylinders via the second exhaust manifold. The exhaust phase of the first set of cylinders is separated in time from the exhaust phase of the second set of cylinders.

According to a second aspect of embodiments herein, the object is achieved by a control unit for controlling exhaust valves of cylinders in an internal combustion engine. The control unit is configured to control a number of first exhaust valves for a first set of cylinders to transfer exhaust gas to a turbine during part of an exhaust phase of the first set of cylinders via a first exhaust manifold. The control unit is also configured to control a number of second exhaust valves for the first set of cylinders to transfer exhaust gas to an exhaust gas recirculation, EGR, conduit during part of the exhaust phase of the first set of cylinders via a second exhaust manifold. The control unit is further configured to control a number of first exhaust valves for a second set of cylinders to transfer exhaust gas to the turbine during part of an exhaust phase of the second set of cylinders via the first exhaust manifold. Furthermore, the control unit is configured to control a number of second exhaust valves for the second set of cylinders to transfer exhaust gas to the EGR conduit during part of the exhaust phase of the second set of cylinders via the second exhaust manifold. The exhaust phase of the first set of cylinders is separated in time from the exhaust phase of the second set of cylinders.

According to a third aspect of the embodiments herein, a computer program is also provided configured to perform the method described above. Further, according to a fourth aspect of the embodiments herein, carriers are also provided configured to carry the computer program configured for performing the method described above.

According to a fifth aspect of the embodiments herein, the object is achieved by an internal combustion engine comprising a number of cylinders, wherein each cylinder comprise a first exhaust valve for transferring exhaust gas to a turbine and a second exhaust valve for transferring exhaust gas to an Exhaust Gas Recirculation, EGR, conduit. In the internal combustion engine, the physical size of the openings of the number of first exhaust valves is larger than the physical size of the openings of the number of second exhaust valves. Further, according to a sixth aspect of the embodiments herein, a vehicle comprising a control unit as described above, and/or an internal combustion engine as described above is also provided.

By controlling the first and second exhaust valves from the first set of cylinders, e.g. a front exhaust bank, and the first and second exhaust valves from the second set of cylinders, e.g. a rear exhaust bank, in an internal combustion engine as described above, different parts of generated exhaust pulses may be used to alternately drive the turbine and the EGR recirculation depending on the most suitable strategy in view of the current driving mode or conditions. Thus, a more effective utilization of the pulse energy of the generated exhaust gas is achieved. Hence, the use of the pulse energy of exhaust gas from cylinders in an internal combustion engine is improved.

In some embodiments, the first two controlling steps may be performed such that the part of the exhaust phase in which the exhaust gas is transferred to the turbine correspond to a larger part of the exhaust phase, and the part of the exhaust phase in which the exhaust gas is transferred to the EGR conduit correspond to a smaller part of the exhaust phase, and the second two controlling steps may be performed such that the part of the exhaust phase in which the exhaust gas is transferred to the turbine correspond to a larger part of the exhaust phase, and the part of the exhaust phase in which the exhaust gas is transferred to the EGR conduit correspond to a smaller part of the exhaust phase. Optionally, the first two controlling steps may be performed such that the part of the exhaust phase in which the exhaust gas is transferred to the turbine correspond to a larger part of the exhaust phase, and the part of the exhaust phase in which the exhaust gas is transferred to the EGR conduit correspond to a smaller part of the exhaust phase, and the second two controlling steps may be performed such that the part of the exhaust phase in which the exhaust gas is transferred to the EGR conduit correspond to a larger part of the exhaust phase, and the part of the exhaust phase in which the exhaust gas is transferred to the turbine correspond to a smaller part of the exhaust phase. In some embodiments, the turbine may be a single-entry variable geometry turbine, VGT, being connected to the first exhaust manifold.

According to some embodiments, the first exhaust manifold may be connected to the number of first exhaust valves for the first set of cylinders and the number of first exhaust valves for the second set of cylinders. Further, in some embodiments, the second exhaust manifold is connected to the number of second exhaust valves for the first set of cylinders and the number of second exhaust valves for the second set of cylinders. In some embodiments, the number of first and second exhaust valves for the first set of cylinders and the number of first and second exhaust valves for the second set of cylinders may be arranged to be controlled independently of each other. In some embodiments, the number of first and second exhaust valves for the first set of cylinders and the number of first and second exhaust valves for the second set of cylinders are parts of a variable valve system, VVA.

In some embodiments, the physical size of the openings of the number of first exhaust valves for the first set of cylinders and the number of first exhaust valves for the second set of cylinders may be larger than the physical size of the openings of the number of second exhaust valves for the first set of cylinders and the number of second exhaust valves for the second set of cylinders, respectively.

In some embodiments, the combustion cycle of the first set of cylinders may be phase shifted approximately 180 degrees from the combustion cycle of the second set of cylinders such that exhaust phases of the first set of cylinders and exhaust phases of the second set of cylinders are subsequent to each other. Also, according to some embodiments, the first set of cylinders may be a part of a front exhaust bank and the second set of cylinders may be a part of a rear exhaust bank.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
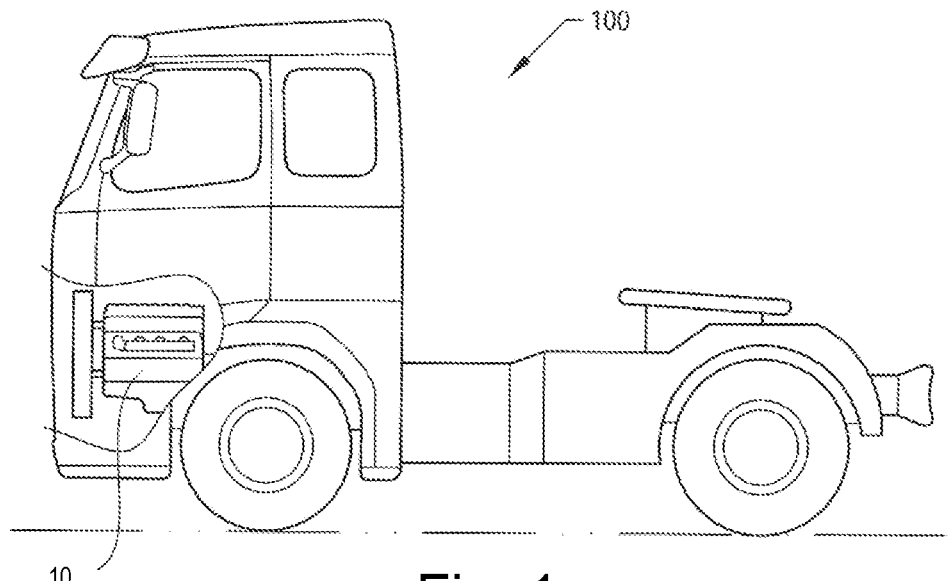
FIG. 1 is an illustration of a vehicle provided with an internal combustion engine according to some embodiments.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows a vehicle 100, here, in the form of a truck, provided with an internal combustion engine 10 configured to be operated according to a method performed by a control unit as described below with reference to FIGS. 2-6. However, it should also be noted that the vehicle 100 may also, for example, be a car, a bus, working machine, construction equipment, or a boat, etc.

Figure 2:
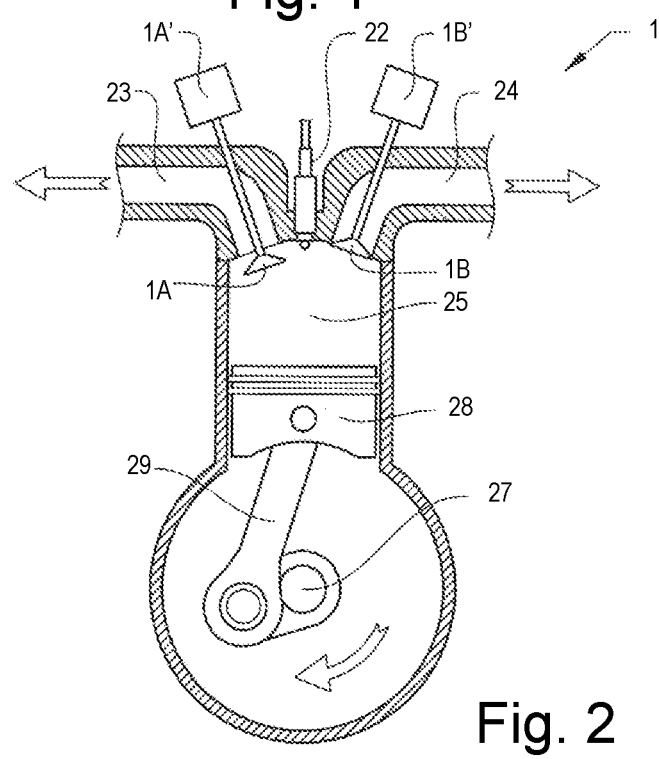
FIG. 2 is a schematic view of a cylinder of the internal combustion engine according to some embodiments.

FIG. 2 shows a schematic view of a cylinder 1 forming part of the internal combustion engine 10 according to FIG. 1. The cylinder 1 is provided with two inlet valves 1C (not shown), as well as, a first and a second exhaust valve 1A, 1B, for controlling communication between a combustion chamber 25 in the cylinder 1 and the exhaust ducts 23, 24, respectively. A piston 28 is connected via a connection rod 29 to a rotatable crankshaft 27 and is configured to move in a reciprocating manner in the cylinder 1 between a top dead center position (TDC) close to the first and second exhaust valves 1A, 1B (i.e. an upper end position in FIG. 2) and a bottom dead center position (BDC) away from the first and second 1A, 1B (i.e. a lower end position in FIG. 2).

Figure 3:
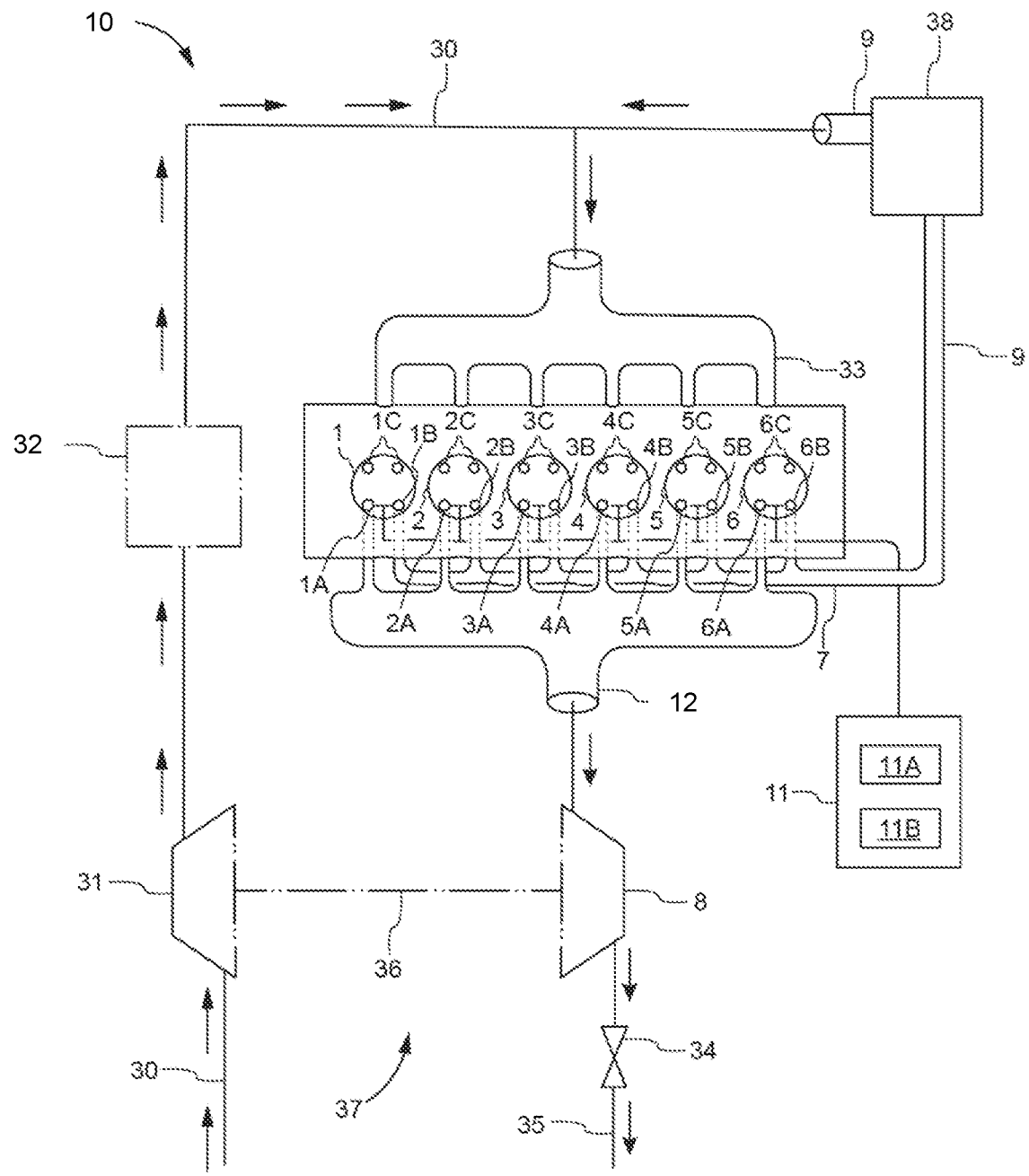
FIG. 3 is a schematic view of an internal combustion engine configured to be operated according to embodiments of a method in a control unit.

Further, the cylinder 1 is provided with exhaust valve actuators 1A', 1B' configured to control opening and closing of the first and second exhaust valves 1A, 1B, i.e. the opening and closing of the openings to the exhaust ducts 23, 24 towards the combustion chamber 25. In this example the exhaust valve actuators 1A', 1B' of the first and second exhaust valves 1A, 1B may form parts of a fully variable valve actuation, VVA, arrangement configured to be controllable by electronic means, e.g. in the form of a control unit 11 as shown in FIG. 3. That is, the engine 10 may in this case be a so-called cam-less engine where timing and lifting of the first and second exhaust valves 1A, 1B is not activated by, nor dependent on, any camshaft but can instead be freely controlled by the fully variable valve actuation, VVA, arrangement in accordance with the embodiments of the control unit 11 described below. A so-called "free-valve" system is one example of a fully variable valve actuation, VVA, arrangement. The exhaust valve actuators of the first and second exhaust valves will not be referred to hereinafter, but is considered included when reference is made to any of the first and second exhaust valves.

FIG. 2 also indicates that the cylinder 1 is provided with a fuel supply system 22 for supplying fuel, such as e.g. diesel, to the cylinder 1.

FIG. 3 shows a schematic view of the internal combustion engine 10 according to FIG. 1. A main intake duct 30 guides intake air via a turbocharging compressor 31, and an optional charge air cooler 32 towards an inlet manifold 33. The inlet manifold 33 further guides the intake air into each of the cylinders 1-6 via each of the two corresponding inlet ducts connected to each of the two inlet valves 1C-6C of the cylinders 1-6. Each of the cylinders 1-6 are identical and configured as shown in FIG. 2.

Exhaust gas leaving the cylinders 1-6 via the respective exhaust ducts corresponding to each of the first exhaust valves 1A-6A of the cylinders 1-6 is channelled via a first exhaust manifold 12 to a turbine 8. The turbine 8 is a part of the turbocharger or turbocharging arrangement 37 comprising the turbine 8, the connecting shaft 36, and the turbocharging compressor 31. The turbine 8 drives the turbocharging compressor 31 via the connecting shaft 36. Downstream the turbine 8, a main exhaust duct 35 may be provided with an adjustable flow restricting member 34 configured to be controlled to restrict a flow of gas through the main exhaust duct 35, and thereby also the flow through the corresponding exhaust ducts connected to each of the first exhaust valves 1A-6A, so as to, for example, allow building up of a back pressure during engine braking. The adjustable flow restricting member 34 may e.g. be a butterfly valve. Furthermore, exhaust gas leaving the cylinders 1-6 via the respective exhaust ducts corresponding to each of the second exhaust valves 1B-6B is channelled via a second exhaust manifold 7 to an exhaust gas recirculation, EGR, conduit 9. Also, an optional EGR cooler 38 may also be arranged in the EGR conduit 9 between the second exhaust manifold 7 and the inlet manifold 33.

FIG. 3 also indicates that the internal combustion engine 10 comprises a control unit 11 configured to control operation of the internal combustion engine 10. This comprises individually controlling each of the first and second exhaust valves 1A-6A, 1B-6B for each of the cylinders 1-6 in accordance with the method described below with reference to FIGS. 4-6. In some embodiments, the turbine 8 may be a single-entry variable geometry turbine, VGT, being connected to the first exhaust manifold 12. As seen in FIG. 3, the turbine 8 may be a conventional single-entry VGT, but since it is connected to and will receive time exhaust pulses from the front and rear exhaust banks separately in time, it may actually be implemented as a twin-entry VGT. According to some embodiments, the first exhaust manifold 12 may be connected to the number of first exhaust valves 1A-3A for the first set of cylinders 1-3 and the number of first exhaust valves 4A-6A for the second set of cylinders 4-6. Also, in some embodiments, the second exhaust manifold 7 is connected to the number of second exhaust valves 1B-3B for the first set of cylinders 1-3 and the number of second exhaust valves 4B-6B for the second set of cylinders 4-6. As may be seen in FIG. 3, this means that the first exhaust manifold 12 is a separate exhaust manifold connecting the first exhaust valves 1A-6A of the cylinders 1-6 to the turbine 8, and that the second exhaust manifold 7 is a separate exhaust manifold 7 connecting the second exhaust valves 1B-6B of the cylinders 1-6 to the EGR conduit 9.

In some embodiments, the number of first and second exhaust valves 1A-3A, 1B-3B for the first set of cylinders 1-3 and the number of first and second exhaust valves 4A-6A, 4B-6B for the second set of cylinders 4-6 may be arranged to be controlled independently of each other. As seen in FIG. 3, the control unit 11 may be electrically connected to each of the first and second exhaust valves 1A-6A, 1B-6B for each of the cylinders 1-6. In some embodiments, the number of first and second exhaust valves 1A-3A, 1B-3B for the first set of cylinders 1-3 and the number of first and second exhaust valves 4A-6A, 4B-6B for the second set of cylinders 4-6 may be parts of a variable valve system, VVA. An internal combustion engine 10 equipped with a variable valve timing actuation system or VVA is free from the constraint of having the same valve timing for all engine speeds and conditions, allowing performance to be improved over the engine's whole operating range. One example of a fully variable valve actuation, VVA, arrangement is a so-called "free-valve" system, but other VVA system may equally be used.

In some embodiments, the combustion cycle of the first set of cylinders 1-3 may be phase shifted approximately 180 degrees from the combustion cycle of the second set of cylinders 4-6 such that the exhaust phases $\Delta t_1$ of the first set of cylinders 1-3 and the exhaust phases $\Delta t_2$ of the second set of cylinders 4-6 are subsequent to each other. As mentioned above, this is the normal configuration of the front and rear exhaust banks of a straight 6-cylinder engine, however, if another phase-shift is implemented between the cylinders 1-6, then the control of the first and second exhaust valves 1A-6A, 1B-6B for each of the cylinders 1-6 may be adapted accordingly. According to some embodiments, the first set of cylinders 1-3 is part of a front exhaust bank and the second set of cylinders 4-6 is part of a rear exhaust bank.

According to some embodiments, the physical size of the openings of the number of first exhaust valves 1A-3A for the first set of cylinders 1-3 and the number of first exhaust valves 4A-6A for the second set of cylinders 4-6 may be larger than the physical size of the openings of the number of second exhaust valves 1B-3B for the first set of cylinders 1-3 and the number of second exhaust valves 4B-6B for the second set of cylinders 4-6, respectively. This has the advantage of reducing the exhaust flow resistance for the exhaust gas from the cylinders 1-6, and thus reducing the gas exchange loss of the internal combustion engine 10.

Figure 4:
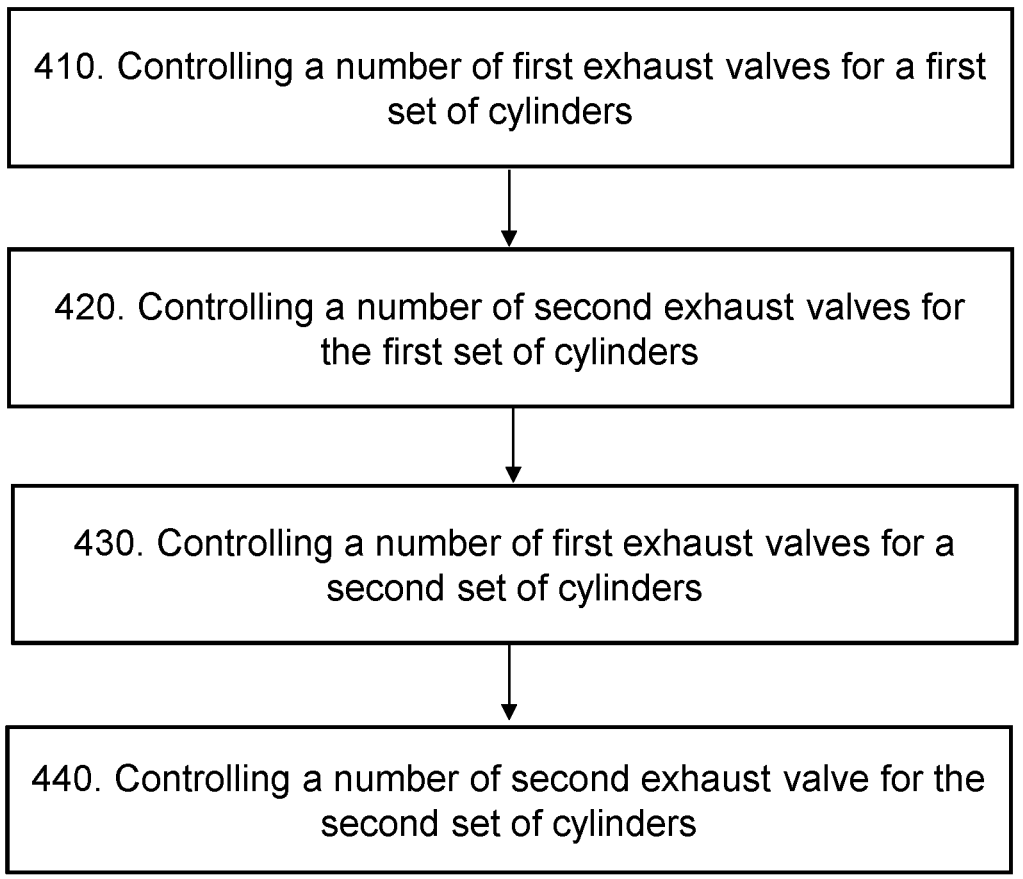
FIG. 4 is a flowchart illustrating embodiments of a method in a control unit.

It should also be noted that the control of each of the first and second exhaust valves 1A-6A, 1B-6B for each of the cylinders 1-6 in accordance with the method described below with reference to FIGS. 4-6 may also be adapted such that an EGR valve in the EGR conduit 9 is no longer needed.

The control unit 11 may also control the fuel supply system 22, and the adjustable flow restricting member 34. This may be performed, for example, so as to aid the internal combustion engine 10 in an engine braking mode. According to some embodiments, although not shown in FIG. 3, the control unit 11 may also be configured to control the inlet valves 1C-6C via the VVA arrangement, which may also be connected to inlet valve actuators of the inlet valves 1C-6C. In line with conventional engines, the control unit 11 may also be configured to control also various other components of the internal combustion engine 10 and to receive various input signals from sensors of various kinds. The control unit 11 may also comprise processing circuitry 11A and a memory 11B and is described in more detail below.

According to some embodiments, the internal combustion engine 10 may comprise a number of cylinders 1-6, wherein each cylinder 1-6 comprise a first exhaust valve 1A-6A for transferring exhaust gas to a turbine 8 and a second exhaust valve 1B-6B for transferring exhaust gas to an Exhaust Gas Recirculation, EGR, conduit 9. In the internal combustion engine 10, the physical size of the openings of the number of first exhaust valves 1A-6A is larger than the physical size of the openings of the number of second exhaust valves 1B-6B. This has the advantage of reducing the exhaust flow resistance for the exhaust gas from the cylinders 1-6, and thus reducing the gas exchange loss of the internal combustion engine 10. For example, the exhaust gas flow to the turbine 8 may be arranged to be double that of the exhaust gas flow to the EGR conduit 9 without impeding the operation of the internal combustion engine 10.

A further advantage is that a higher engine brake momentum may be achieved as smaller valves, such as, the second exhaust valves 1B-6B, may be opened against a higher cylinder pressure, e.g. in order to reduce the compression pressure in the cylinder, and a larger diameter of the valves requires more force to be open. In some embodiments, the internal combustion engine 10 may further comprise a variable valve system, VVA, having a control unit 11 as described herein with reference to FIGS. 2-6.

Examples of embodiments of a method performed by a control unit 11 for controlling exhaust valves 1A-6A, 1B-6B of cylinders 1-6 in an internal combustion engine 10 will now be described with reference to the flowchart depicted in FIG. 4. FIG. 4 is an illustrated example of actions or operations which may be taken by the control unit 11 in FIG. 3. The method may comprise the following actions.

Action 410

The control unit 11 controls a number of first exhaust valves 1A-3A for a first set of cylinders 1-3 to transfer exhaust gas to the turbine 8 during a part of an exhaust phase $\Delta t_1$ of the first set of cylinders 1-3 via the first exhaust manifold 12. This means that the exhaust phase $\Delta t_1$ of the combustion cycle for the first set of cylinders 1-3, e.g. the front exhaust bank, may be used to alternately drive the turbine 8.

Action 420

After controlling the first exhaust valves 1A-3A for the first set of cylinders 1-3 in Action 410, the control unit 11 controls a number of second exhaust valves 1B-3B for the first set of cylinders 1-3 to transfer exhaust gas to the exhaust gas recirculation, EGR, conduit 9 during a part of the exhaust phase $\Delta t_1$ of the first set of cylinders 1-3 via the second exhaust manifold 7. This means that the exhaust phase $\Delta t_1$ of the combustion cycle for the first set of cylinders 1-3 may be used to alternately drive the EGR recirculation.

Action 430

After controlling the second exhaust valves 1B-3B for the first set of cylinders 1-3 in Action 420, the control unit 11 controls a number of first exhaust valves 4A-6A for a second set of cylinders 4-6 to transfer exhaust gas to the turbine 8 during a part of an exhaust phase $\Delta t_2$ of the second set of cylinders 4-6 via the first exhaust manifold 12. This means that the exhaust phase $\Delta t_2$ of the combustion cycle for the second set of cylinders 4-6, e.g. the rear exhaust bank, may be used to alternately drive the turbine 8.

Action 440

After controlling the first exhaust valves 4A-6A for the second set of cylinders 4-6 in Action 430, the control unit 11 controls a number of second exhaust valves 4B-6B for the second set of cylinders 4-6 to transfer exhaust gas to the EGR conduit 9 during a part of the exhaust phase $\Delta t_2$ of the second set of cylinders 4-6 via the second exhaust manifold 7. This means that the exhaust phase $\Delta t_2$ of the combustion cycle for the second set of cylinders 4-6 may be used to alternately drive the EGR recirculation.

How to alternate the transfer of exhaust gas generated during different parts of the exhaust phases of the first and second set of cylinders 1-6, e.g. the front and rear exhaust banks, between driving the turbine 8 and the EGR recirculation may depend on which strategy the control unit 11 decides to employ. The selection of strategy by the control unit 11 may be based on the current driving mode or conditions, such as, e.g. steady-state driving at high power levels or load pulls at or from low engine speeds. Although only two different example strategies A and B are shown and described below with reference to FIG. 5 and FIG. 6, respectively, further strategies, based on the control of the exhaust valves 1A-6A, 1B-6B during the exhaust phases $\Delta t_1$, $\Delta t_2$ as described above, for different driving modes and conditions may also be envisioned.

In the diagrams of the upper parts of FIG. 5-6, the exhaust phases of the combustion cycles for the first set of cylinders 1-3 (denoted by Front) and the second set of cylinders 4-6 (denoted Rear) are shown above the timeline, while the intake phase of the combustion cycles for the first set of cylinders 1-3 and the second set of cylinders 4-6 are shown below the timeline. In this example, it may be seen that the combustion cycle of the first set of cylinders 1-3 and the combustion cycle of the second set of cylinders 4-6 are substantially phase-shifted 180 degrees in respect of each other. This is normally the case between the front and rear exhaust banks of a straight 6-cylinder engine. This is one example of how the exhaust phase $\Delta t_1$ of the first set of cylinders 1-3 may be separated in time from the exhaust phase $\Delta t_2$ of the second set of cylinders 4-6. It should also be noted that the control unit 11 may control the first and second exhaust valves 1A-3A, 1B-3B for the first set of cylinders 1-3 and the first and second exhaust valves 4A-6A, 4B-6B for the second set of cylinders 4-6 sequentially or subsequently in relation to each other in order to cause the time separation of the exhaust gas during the exhaust phases $\Delta t_1$, $\Delta t_2$ in the first exhaust manifold 12 and the second exhaust manifold 7, respectively.

According to some embodiments, a first example strategy "A" may be executed by the control unit 11. The exhaust flows directions from cylinders 1-6 of the internal combustion engine 10 in accordance with the first example strategy "A" are illustrated and described below in reference to the diagrams in the lower part of FIG. 5.

According to the first example strategy "A", a forceful early part of the exhaust pulse from the first set of cylinders 1-3 is used to drive the turbine 8, while a less forceful latter part of the exhaust pulse from the first set of cylinders 1-3 is used to drive the EGR recirculation. This is illustrated in FIG. 5 by the areas denoted 1-3 in the first and third diagram. In the first diagram, the area 1-3 represent a first part of the exhaust phase $\Delta t_1$ in which the exhaust flow is directed to the turbine 8 via the first manifold 12 from the first set of cylinders 1-3. In the third diagram, the area 1-3 represent the second part of the exhaust phase $\Delta t_1$ in which the exhaust flow is directed to the EGR conduit 9 via the second manifold 7 from the first set of cylinders 1-3. In other words, this means that the control unit 11 may, during a first part of the exhaust phase $\Delta t_1$, open the first exhaust valves 1A-3A for the first set of cylinders 1-3, while closing the second exhaust valves 1B-3B for the first set of cylinders 1-3. Then, for a second part of the exhaust phase $\Delta t_1$, the control unit 11 may open the second exhaust valves 1B-3B for the first set of cylinders 1-3, while closing the first exhaust valves 1A-3A for the first set of cylinders 1-3.

Similarly, and in accordance with the first example strategy "A", the control unit 11 may control the first and second exhaust valves 4A-6A, 4B-6B of the second set of cylinders 4-6 in the same way during the exhaust phase $\Delta t_2$ of the second set of cylinders 4-6. This means that, subsequent to the exhaust phase $\Delta t_1$ of the first set of cylinders 1-3 and during the exhaust phase $\Delta t_2$ of the second set of cylinders 4-6, the forceful early part of the exhaust pulse from the second set of cylinders 4-6 is used to drive the turbine 8, while a less forceful latter part of the exhaust pulse from the second set of cylinders 4-6 is used to drive the EGR recirculation. This is illustrated in FIG. 5 by the areas denoted 4-6 in the second and fourth diagram. In the second diagram, the area 4-6 represent a first part of the exhaust phase $\Delta t_2$ in which the exhaust flow is directed to the turbine 8 via the first manifold 12 from the second set of cylinders 4-6. In the fourth diagram, the area 4-6 represent the second part of the exhaust phase $\Delta t_2$ in which the exhaust flow is directed to the EGR conduit 9 via the second manifold 7 from the second set of cylinders 4-6. In other words, this means that the control unit 11 may, during a first part of the exhaust phase $\Delta t_2$, open the first exhaust valves 4A-6A for the second set of cylinders 4-6, while closing the second exhaust valves 4B-6B for the first set of cylinders 4-6. Then, for a second part of the exhaust phase $\Delta t_2$, the control unit 11 may open the second exhaust valves 4B-6B for the second set of cylinders 4-6, while closing the first exhaust valves 4A-6A for the second set of cylinders 4-6.

In some embodiments, the control by the control unit 11 may be performed such that the part of the exhaust phase $\Delta t_1$ in which the exhaust gas is transferred to the turbine 8 correspond to a larger part of the exhaust phase $\Delta t_1$, and the part of the exhaust phase $\Delta t_1$ in which the exhaust gas is transferred to the EGR conduit 9 correspond to a smaller part of the exhaust phase $\Delta t_1$. In this case, the control by the control unit 11 may also be performed such that the part of the exhaust phase $\Delta t_2$ in which the exhaust gas is transferred to the turbine 8 correspond to a larger part of the exhaust phase $\Delta t_2$, and the part of the exhaust phase $\Delta t_2$ in which the exhaust gas is transferred to the EGR conduit 9 correspond to a smaller part of the exhaust phase $\Delta t_2$.

This first example strategy "A" may suitably be used by the control unit 11 during so-called steady-state driving at high power levels. This is because the high energy parts of the exhaust pulses from both the front and rear exhaust banks, i.e. from all cylinders 1-6, of the internal combustion engine 10 is directed towards the turbine 8, which means that these high energy pulses will, to a large extent, cancel each other out. One advantage is that this will generate a less pulsating and smoother exhaust flow, which allows a suitable flow-to-pressure relation between the turbocharging compressor 31 and turbine 8 to be maintained. Meanwhile, the lower energy parts of the exhaust pulses is directed to the EGR conduit 9, which reduces the pump losses of the internal combustion engine 10. The latter assuming that the EGR conduit 9 provides a lower counter pressure than the turbine 8.

According to some embodiments, a second example strategy "B" may also be executed by the control unit 11. The exhaust flows directions from cylinders 1-6 of the internal combustion engine 10 in accordance with the second example strategy "B" are illustrated and described below in reference to the diagrams in the lower part of FIG. 6.

According to the second example strategy "B", a forceful early part of the exhaust pulse from the first set of cylinders 1-3 is still used to drive the turbine 8, while a less forceful latter part of the exhaust pulse from the first set of cylinders 1-3 is still used to drive the EGR recirculation. Similarly as in FIG. 5, this is illustrated in FIG. 6 by the areas denoted 1-3 in the first and third diagram. In the first diagram, the area 1-3 represent a first part of the exhaust phase $\Delta t_1$ in which the exhaust flow is directed to the turbine 8 via the first manifold 12 from the first set of cylinders 1-3. In the third diagram, the area 1-3 represent the second part of the exhaust phase $\Delta t_1$ in which the exhaust flow is directed to the EGR conduit 9 via the second manifold 7 from the first set of cylinders 1-3. In other words, this means that the control unit 11 may, during a first part of the exhaust phase $\Delta t_1$, open the first exhaust valves 1A-3A for the first set of cylinders 1-3, while closing the second exhaust valves 1B-3B for the first set of cylinders 1-3. Then, for a second part of the exhaust phase $\Delta t_1$, the control unit 11 may open the second exhaust valves 1B-3B for the first set of cylinders 1-3, while closing the first exhaust valves 1A-3A for the first set of cylinders 1-3.

Figure 5:
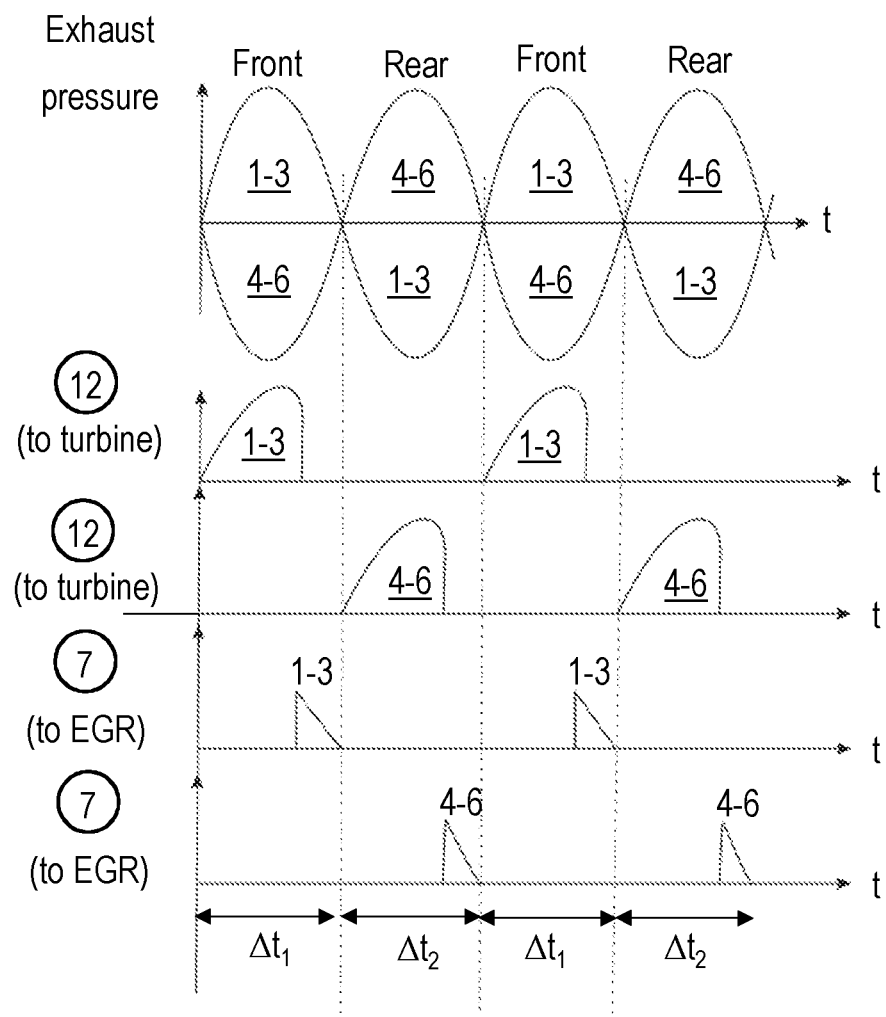
FIG. 5 is a schematic diagram illustrating exhaust flows directions from cylinders of an internal combustion engine in accordance with some embodiments.
Figure 6:
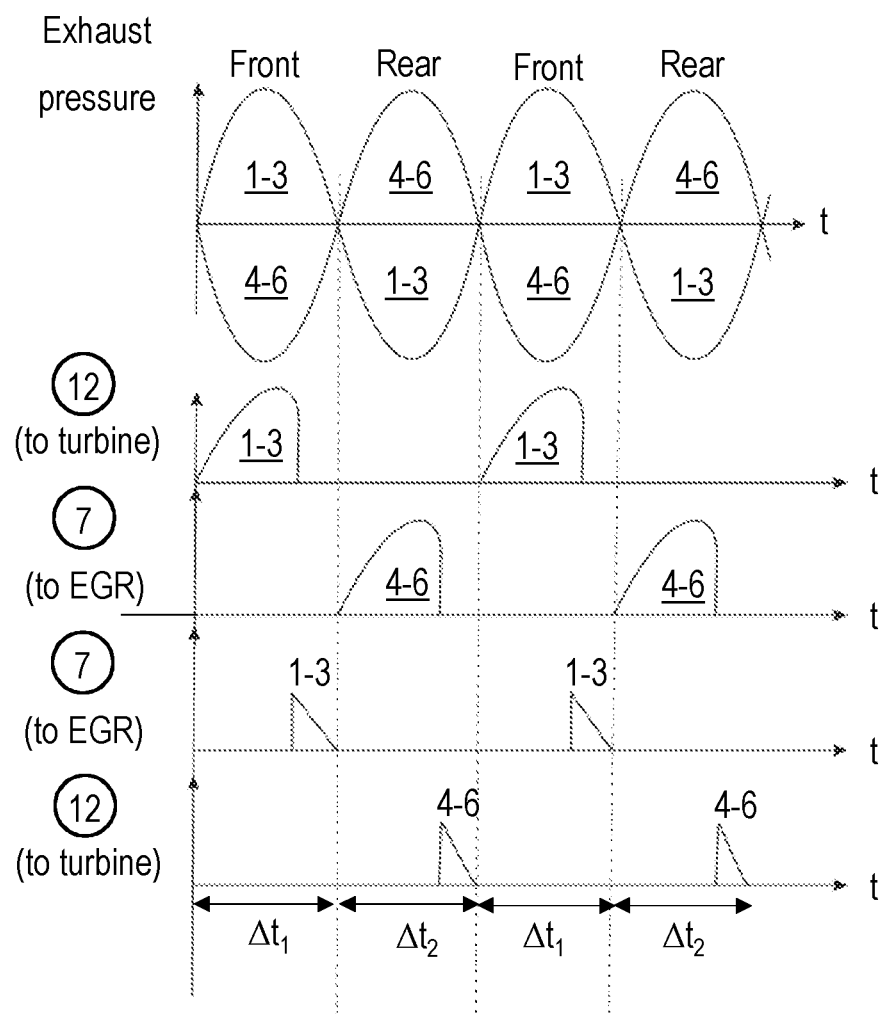
FIG. 6 is another schematic diagram illustrating exhaust flows directions from cylinders of an internal combustion engine in accordance with some embodiments.

However, contrary to the first example strategy "A" shown in FIG. 5, the control unit 11 may here control the first and second exhaust valves 4A-6A, 4B-6B of the second set of cylinders 4-6 in the opposite way during the exhaust phase $\Delta t_2$ of the second set of cylinders 4-6. This means that, subsequent to the exhaust phase $\Delta t_1$ of the first set of cylinders 1-3 and during the exhaust phase $\Delta t_2$ of the second set of cylinders 4-6, the forceful early part of the exhaust pulse from the second set of cylinders 4-6 is instead used to drive the EGR recirculation, while the less forceful latter part of the exhaust pulse from the second set of cylinders 4-6 is used to drive the turbine 8. This is illustrated in FIG. 6 by the areas denoted 4-6 in the second and fourth diagram. In the second diagram, the area 4-6 represent a first part of the exhaust phase $\Delta t_2$ in which the exhaust flow is directed to the EGR conduit 9 via the second manifold 7 from the second set of cylinders 4-6. In the fourth diagram, the area 4-6 represent the second part of the exhaust phase $\Delta t_2$ in which the exhaust flow is directed to the turbine 8 via the first manifold 12 from the second set of cylinders 4-6. In other words, this means that the control unit 11 may, during a first part of the exhaust phase $\Delta t_2$, open the second exhaust valves 4B-6B for the second set of cylinders 4-6, while closing the first exhaust valves 4A-6A for the second set of cylinders 4-6. Then, for a second part of the exhaust phase $\Delta t_2$, the control unit 11 may open the first exhaust valves 4A-6A for the second set of cylinders 4-6, while closing the second exhaust valves 4B-6B for the first set of cylinders 4-6.

In some embodiments, the control by the control unit 11 may be performed such that the part of the exhaust phase $\Delta t_1$ in which the exhaust gas is transferred to the turbine 8 correspond to a larger part of the exhaust phase $\Delta t_1$, and the part of the exhaust phase $\Delta t_1$ in which the exhaust gas is transferred to the EGR conduit 9 correspond to a smaller part of the exhaust phase $\Delta t_1$. In this case, the control by the control unit 11 may also be performed such that the part of the exhaust phase $\Delta t_2$ in which the exhaust gas is transferred to the EGR conduit 9 correspond to a larger part of the exhaust phase $\Delta t_2$, and the part of the exhaust phase $\Delta t_2$ in which the exhaust gas is transferred to the turbine 8 correspond to a smaller part of the exhaust phase $\Delta t_2$.

This second example strategy "B" may suitably be used by the control unit 11 during load pull, particularly at or from low engine speeds. In this case, the high energy parts of the exhaust pulses from both the front and rear exhaust banks, i.e. from all cylinders 1-6, of the internal combustion engine 10 will be separated so as not to cancel each other out. One advantage is that this will generate pulse charging of the turbocharging compressor 31 via the turbine 8.

To perform the method actions in the control unit 11 for controlling exhaust valves 1A-6A, 1B-6B of cylinders 1-6 in an internal combustion engine 10, the control unit 11 may comprise processing circuitry 11A and a memory 11B. Some or all of the functionality described in the embodiments herein as being performed by the control unit 11 may be provided by the processing circuitry 11A executing instructions stored on a computer-readable medium, such as, e.g. the memory 11B shown in FIG. 3.

The control unit 11 or the processing circuitry 11A is configured to control a number of first exhaust valves 1A-3A for a first set of cylinders 1-3 to transfer exhaust gas to a turbine 8 during part of an exhaust phase $\Delta t_1$ of the first set of cylinders 1-3 via a first exhaust manifold 12. Also, the control unit 11 or the processing circuitry 11A is configured to control a number of second exhaust valves 1B-3B for the first set of cylinders 1-3 to transfer exhaust gas to an exhaust gas recirculation, EGR, conduit 9 during part of the exhaust phase $\Delta t_1$ of the first set of cylinders 1-3 via a second exhaust manifold 7. Further, the control unit 11 or the processing circuitry 11A is configured to controls a number of first exhaust valves 4A-6A for a second set of cylinders 4-6 to transfer exhaust gas to the turbine 8 during part of an exhaust phase $\Delta t_2$ of the second set of cylinders 4-6 via the first exhaust manifold 12. The control unit 11 or the processing circuitry 11A is furthermore configured to control a number of second exhaust valves 4B-6B for the second set of cylinders 4-6 t during part of the exhaust phase $\Delta t_2$ of the second set of cylinders 4-6 during the first part $\Delta t_1$ of the exhaust phase via the second exhaust manifold 7. Here, the exhaust phase $\Delta t_1$ of the first set of cylinders 1-3 is separated in time from the exhaust phase $\Delta t_2$ of the second set of cylinders 4-6.

In some embodiments, the control unit 11 or the processing circuitry 11A may be configured to control of the first and second exhaust valves 1A-6A, 1B-6B such that the part of the exhaust phase $\Delta t_1$ in which the exhaust gas is transferred to the turbine 8 correspond to a larger part of the exhaust phase $\Delta t_1$, and the part of the exhaust phase $\Delta t_1$ in which the exhaust gas is transferred to the EGR conduit 9 correspond to a smaller part of the exhaust phase $\Delta t_1$, and such that the part of the exhaust phase $\Delta t_2$ in which the exhaust gas is transferred to the turbine 8 correspond to a larger part of the exhaust phase $\Delta t_2$, and the part of the exhaust phase $\Delta t_2$ in which the exhaust gas is transferred to the EGR conduit 9 correspond to a smaller part of the exhaust phase $\Delta t_2$.

In some embodiments, the control unit 11 or the processing circuitry 11A may be configured to control of the first and second exhaust valves 1A-6A, 1B-6B such that the part of the exhaust phase $\Delta t_1$ in which the exhaust gas is transferred to the turbine 8 correspond to a larger part of the exhaust phase $\Delta t_1$, and the part of the exhaust phase $\Delta t_1$ in which the exhaust gas is transferred to the EGR conduit 9 correspond to a smaller part of the exhaust phase $\Delta t_1$, and such that the part of the exhaust phase $\Delta t_2$ in which the exhaust gas is transferred to the EGR conduit 9 correspond to a larger part of the exhaust phase $\Delta t_2$, and the part of the exhaust phase $\Delta t_2$ in which the exhaust gas is transferred to the turbine 8 correspond to a smaller part of the exhaust phase $\Delta t_2$.

Also, in some embodiments, the control unit 11 or the processing circuitry 11A may be configured to control the number of first and second exhaust valves 1A-3A, 1B-3B for the first set of cylinders 1-3 and the number of first and second exhaust valves 4A-6A, 4B-6B for the second set of cylinders 4-6 independently of each other. In some embodiments, the control unit 11, the number of first and second exhaust valves 1A-3A, 1B-3B for the first set of cylinders 1-3, and the number of first and second exhaust valves 4A-6A, 4B-6B for the second set of cylinders 4-6, are parts of a variable valve system, VVA.

Furthermore, the embodiments for controlling exhaust valves 1A-6A, 1B-6B of cylinders 1-6 in an internal combustion engine 10 described above may be implemented through one or more processors, such as the processing circuitry 11A in the control unit 11 depicted in FIG. 3, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 11A in the control unit 11. The data carrier, or computer readable medium, may be one of an electronic signal, optical signal, radio signal, or computer-readable storage medium. The computer program code may e.g. be provided as pure program code in the control unit 11 or on a server and downloaded to the control unit 11. Thus, it should be noted that the control unit 11 may in some embodiments be implemented as computer programs stored in memory, e.g. in the memory modules 11B in FIG. 3, for execution by processors or processing modules, e.g. the processing circuitry 11A of FIG. 3.

Those skilled in the art will also appreciate that the processing circuitry 11A and the memory 11B described above may refer to a combination of analog and digital circuits, and/or one or more processors configured with software and/or firmware, e.g. stored in a memory, that when executed by the one or more processors such as the processing circuitry 11A perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. A method performed by a control unit for controlling exhaust valves of cylinders in an internal combustion engine, the method comprising: controlling a number of first exhaust valves for a first set of cylinders to transfer exhaust gas to a turbine during part of an exhaust phase of the first set of cylinders via a first exhaust manifold; controlling a number of second exhaust valves for the first set of cylinders to transfer exhaust gas to an exhaust gas recirculation, EGR, conduit during part of the exhaust phase of the first set of cylinders via a second exhaust manifold; controlling a number of first exhaust valves for a second set of cylinders to transfer exhaust gas to the turbine during part of an exhaust phase of the second set of cylinders via the first exhaust manifold; and controlling a number of second exhaust valves for the second set of cylinders to transfer exhaust gas to the EGR conduit during part of the exhaust phase of the second set of cylinders via the second exhaust manifold, wherein the exhaust phase of the first set of cylinders is separated in time from the exhaust phase of the second set of cylinders);

wherein the exhaust phase of the first set of cylinders is separated in time from the exhaust phase of the second set of cylinders, and the controlling of the first and second exhaust valves for the first set of cylinders is performed such that the part of the exhaust phase in which the exhaust gas is transferred to the turbine correspond to a larger part of the exhaust phase, and the part of the exhaust phase in which the exhaust gas is transferred to the EGR conduit correspond to a smaller part of the exhaust phase, and the controlling of the first and second exhaust valves for the second set of cylinders is performed such that the part of the exhaust phase in which the exhaust gas is transferred to the EGR conduit correspond to a larger part of the exhaust phase, and the part of the exhaust phase in which the exhaust gas is transferred to the turbine correspond to a smaller part of the exhaust phase.

2. The method according to claim 1, wherein the turbine is a single-entry variable geometry turbine, VGT, being connected to the first exhaust manifold.

3. The method according to claim 1, wherein the first exhaust manifold is connected to the number of first exhaust valves for the first set of cylinders and the number of first exhaust valves for the second set of cylinders.

4. The method according to claim 1, wherein the second exhaust manifold is connected to the number of second exhaust valves for the first set of cylinders and the number of second exhaust valves for the second set of cylinders.

5. The method according to claim 1, wherein the number of first and second exhaust valves for the first set of cylinders and the number of first and second exhaust valves for the second set of cylinders are arranged to be controlled independently of each other.

6. The method according to claim 5, wherein the number of first and second exhaust valves for the first set of cylinders and the number of first and second exhaust valves for the second set of cylinders are parts of a variable valve system, VVA.

7. The method according to claim 1, wherein the physical size of the openings of the number of first exhaust valves for the first set of cylinders and the number of first exhaust valves for the second set of cylinders is larger than the physical size of the openings of the number of second exhaust valves for the first set of cylinders and the number of second exhaust valves for the second set of cylinders, respectively.

8. The method according to claim 1, wherein the combustion cycle of the first set of cylinders is phase shifted approximately 180 degrees from the combustion cycle of the second set of cylinders such that exhaust phases of the first set of cylinders and exhaust phases of the second set of cylinders are subsequent to each other.

9. The method according to claim 1, wherein the first set of cylinders is part of a front exhaust bank and the second set of cylinders is part of a rear exhaust bank.

10. A non-transitory computer-readable storage medium comprising computer program instructions which, when executed in a control unit for controlling exhaust valves of cylinders in an internal combustion engine, cause the control unit to carry out the method according to claim 1.

11. A control unit for controlling exhaust valves of cylinders in an internal combustion engine, wherein the control unit is configured to control a number of first exhaust valves for a first set of cylinders to transfer exhaust gas to a turbine during part of an exhaust phase of the first set of cylinders via a first exhaust manifold, control a number of second exhaust valves for the first set of cylinders to transfer exhaust gas to an exhaust gas recirculation, EGR, conduit during part of the exhaust phase of the first set of cylinders via a second exhaust manifold, control a number of first exhaust valves for a second set of cylinders to transfer exhaust gas to the turbine during part of an exhaust phase of the second set of cylinders via the first exhaust manifold; and control a number of second exhaust valves for the second set of cylinders to transfer exhaust gas to the EGR conduit during part of the exhaust phase of the second set of cylinders via the second exhaust manifold, wherein the exhaust phase of the first set of cylinders is separated in time from the exhaust phase of the second set of cylinders, and the control of the first and second exhaust valves for the first set of cylinders is performed such that the part of the exhaust phase in which the exhaust gas is transferred to the turbine correspond to a larger part of the exhaust phase, and the part of the exhaust phase in which the exhaust gas is transferred to the EGR conduit correspond to a smaller part of the exhaust phase, and in that the control of the first and second exhaust valves for the second set of cylinders is performed such that the part of the exhaust phase in which the exhaust gas is transferred to the EGR conduit correspond to a larger part of the exhaust phase, and the part of the exhaust phase in which the exhaust gas is transferred to the turbine correspond to a smaller part of the exhaust phase.

12. The control unit according to claim 11, wherein the control unit is configured to control the number of first and second exhaust valves for the first set of cylinders and the number of first and second exhaust valves for the second set of cylinders independently of each other.

13. The control unit according to claim 12, wherein the control unit, the number of first and second exhaust valves for the first set of cylinders, and the number of first and second exhaust valves for the second set of cylinders, are parts of a variable valve system, VVA.

14. The control unit according to claim 11, comprising at least one processor and at least one memory, wherein the at least one memory comprise instructions executable by the at least one processor.

15. A vehicle comprising a control unit according to claim 11.

16. The vehicle according to claim 15, wherein the vehicle is a car, a truck, a bus, working machine, construction equipment, or a boat.

* * * * *